(12) United States Patent
Kim et al.

(10) Patent No.: US 9,516,489 B2
(45) Date of Patent: Dec. 6, 2016

(54) METHOD OF SEARCHING FOR DEVICE BETWEEN ELECTRONIC DEVICES

(71) Applicant: Samsung Electronics Co., Ltd., Suwon-si, Gyeonggi-do (KR)

(72) Inventors: Su Hyun Kim, Yongin-si (KR); Min Gu Kang, Daegu (KR); Hye Jung Bang, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 14/627,215

(22) Filed: Feb. 20, 2015

(65) Prior Publication Data

US 2015/0245194 A1 Aug. 27, 2015

(30) Foreign Application Priority Data

Feb. 23, 2014 (KR) ........................ 10-2014-0021013

(51) Int. Cl.
*H04W 8/00* (2009.01)
*H04W 4/00* (2009.01)
*H04W 76/02* (2009.01)

(52) U.S. Cl.
CPC ............. *H04W 8/005* (2013.01); *H04W 4/008* (2013.01); *H04W 76/023* (2013.01)

(58) Field of Classification Search
CPC ... G06K 19/0723; H04W 84/18; H04W 8/005; H04W 4/008; H04W 76/023
USPC ............................................... 455/41.1, 41.2
See application file for complete search history.

(56) References Cited

U.S. PATENT DOCUMENTS

| | | | | |
|---|---|---|---|---|
| 6,091,725 A | * | 7/2000 | Cheriton | H04L 12/4608 370/392 |
| 6,452,930 B1 | * | 9/2002 | Seidman | H04H 20/86 370/400 |
| 6,512,756 B1 | * | 1/2003 | Mustajarvi | H04W 60/04 370/341 |
| 6,798,776 B1 | * | 9/2004 | Cheriton | H04L 12/4608 370/392 |
| 7,039,445 B1 | * | 5/2006 | Yoshizawa | H04M 1/7253 343/754 |
| 7,072,697 B2 | * | 7/2006 | Lappetelainen | H04W 52/0229 455/343.5 |
| 7,085,814 B1 | * | 8/2006 | Gandhi | H04L 29/1232 709/208 |
| 7,174,447 B2 | * | 2/2007 | Zimmer | G06F 9/4411 713/1 |
| 7,443,858 B1 | * | 10/2008 | Cheriton | H04L 12/4608 370/395.1 |
| 7,565,108 B2 | * | 7/2009 | Kotola | G06K 7/0008 455/41.2 |

(Continued)

*Primary Examiner* — Hai V Nguyen
(74) *Attorney, Agent, or Firm* — Jefferson IP Law, LLP

(57) ABSTRACT

A method of searching for an electronic device between electronic devices is provided. The method includes advertising, by a first electronic device, a request signal, receiving, by the first electronic device, a response signal from a second electronic device having received the request signal, updating, by the first electronic device, the request signal to include identification information identifying at least part of the second electronic device, advertising, by the first electronic device, the updated request signal, and receiving, by the first electronic device, the response signal from the at least part of the second electronic device.

22 Claims, 7 Drawing Sheets

(56) References Cited

U.S. PATENT DOCUMENTS

| | | | | |
|---|---|---|---|---|
| 7,570,656 B2* | 8/2009 | Raphaeli | ............... | H04B 3/542 370/445 |
| 7,613,484 B2* | 11/2009 | Lappetel inen | ... | H04W 52/0229 455/343.2 |
| 7,684,376 B2* | 3/2010 | Akaiwa | ............... | H04M 1/7253 370/338 |
| 7,835,943 B2* | 11/2010 | Cheung | ............. | G06F 17/30864 705/14.54 |
| 8,059,572 B2* | 11/2011 | Kim | .................... | H04W 72/005 370/252 |
| 8,090,359 B2* | 1/2012 | Proctor, Jr. | ......... | G06Q 30/0623 455/414.3 |
| 8,116,749 B2* | 2/2012 | Proctor, Jr. | ......... | G06Q 30/0623 455/411 |
| 8,223,782 B2* | 7/2012 | Fischer | ................. | H04W 48/18 370/405 |
| 8,296,816 B2* | 10/2012 | Grannan | ................ | H04N 5/445 725/120 |
| 8,401,027 B2* | 3/2013 | Cheriton | ............ | H04L 12/4608 370/231 |
| 8,462,961 B1* | 6/2013 | Bywaters | ............ | H04L 12/1895 381/77 |
| 8,554,141 B2* | 10/2013 | Desai | ...................... | H04L 63/02 455/41.1 |
| 8,626,144 B2* | 1/2014 | Talty | ..................... | H04W 4/008 455/41.2 |
| 8,699,952 B2* | 4/2014 | Yeung | ................... | H04W 84/18 455/404.2 |
| 8,712,330 B2* | 4/2014 | Desai | ................... | H04B 17/318 370/318 |
| 8,737,917 B2* | 5/2014 | Desai | .................... | H04W 8/005 455/41.2 |
| 8,744,804 B2* | 6/2014 | Messenger | ............. | G06Q 30/02 702/160 |
| 8,788,597 B2* | 7/2014 | Levow | ................. | G06Q 10/107 709/205 |
| 8,813,149 B2* | 8/2014 | Marignan | .......... | H04N 7/17318 725/109 |
| 8,849,205 B2* | 9/2014 | Desai | ...................... | H04L 63/02 455/41.1 |
| 8,856,045 B1* | 10/2014 | Patel | ................... | G06Q 20/3823 705/64 |
| 8,868,847 B2* | 10/2014 | Gonion | ................ | G06F 12/0831 711/146 |
| 8,879,992 B2* | 11/2014 | Kneckt | ................. | H04W 8/005 370/436 |
| 8,929,192 B2* | 1/2015 | Kainulainen | ............. | G01S 3/48 342/147 |
| 8,935,411 B2* | 1/2015 | Palin | .................... | H04W 8/005 709/227 |
| 8,953,471 B2* | 2/2015 | Boland | ............... | H04L 47/2483 370/252 |
| 8,965,284 B2* | 2/2015 | Honkanen | ................ | G01S 3/46 455/41.1 |
| 9,042,823 B2* | 5/2015 | Palin | ................. | H04W 52/0245 370/252 |
| 9,042,829 B2* | 5/2015 | Palin | .................. | H04W 4/008 370/252 |
| 9,054,976 B2* | 6/2015 | Chen | ................. | H04L 61/2076 |
| 9,084,013 B1* | 7/2015 | Arini | ................. | H04N 21/44204 |
| 9,185,652 B2* | 11/2015 | Xie | .................... | H04W 52/0229 |
| 9,204,291 B2* | 12/2015 | Jackson | ................ | H04W 8/245 |
| 2003/0036683 A1* | 2/2003 | Kehr | ..................... | G06F 19/325 600/300 |
| 2003/0228842 A1* | 12/2003 | Heinonen | ............. | H04L 63/083 455/41.2 |
| 2004/0077383 A1* | 4/2004 | Lappetelainen | .. | H04W 52/0229 455/574 |
| 2004/0176032 A1* | 9/2004 | Kotola | .................. | G06K 7/0008 455/41.2 |
| 2004/0203359 A1* | 10/2004 | Sasai | ..................... | H04W 48/18 455/41.1 |
| 2004/0203435 A1* | 10/2004 | Karlquist | .............. | H04W 8/005 455/67.11 |
| 2004/0225564 A1* | 11/2004 | Walsh | ..................... | G06Q 30/02 705/14.61 |
| 2005/0099982 A1* | 5/2005 | Sohn | ................... | H04L 12/2803 370/338 |
| 2005/0185630 A1* | 8/2005 | Aoki | ........................ | H04H 20/72 370/349 |
| 2005/0256766 A1* | 11/2005 | Garcia | ................. | G06F 17/30241 705/14.54 |
| 2006/0062363 A1* | 3/2006 | Albrett | ................... | G06Q 30/02 379/101.01 |
| 2006/0253488 A1* | 11/2006 | Akaiwa | ................. | H04M 1/7253 |
| 2006/0270382 A1* | 11/2006 | Lappetelainen | .. | H04W 52/0229 455/343.2 |
| 2007/0005795 A1* | 1/2007 | Gonzalez | ........... | G06F 17/30017 709/232 |
| 2007/0067267 A1* | 3/2007 | Ives | ....................... | G06Q 30/02 |
| 2008/0037723 A1* | 2/2008 | Milstein | ............ | H04M 3/53375 379/88.12 |
| 2008/0107392 A1* | 5/2008 | Grannan | ................ | H04N 5/445 386/291 |
| 2008/0109302 A1* | 5/2008 | Salokannel | ............ | G06Q 30/02 705/14.1 |
| 2008/0181161 A1* | 7/2008 | Gi Kim | ............... | H04W 72/005 370/312 |
| 2009/0046734 A1* | 2/2009 | Cheriton | ............. | H04L 12/4645 370/412 |
| 2009/0076912 A1* | 3/2009 | Rajan | ................ | G06Q 30/0267 705/14.64 |
| 2009/0190553 A1* | 7/2009 | Masuda | ................ | H04W 8/005 370/331 |
| 2010/0014519 A1* | 1/2010 | Fernandez Gutierrez | ................. | H04L 12/185 370/390 |
| 2010/0062746 A1* | 3/2010 | Proctor, Jr. | ......... | G06Q 30/0623 455/411 |
| 2010/0121567 A1* | 5/2010 | Mendelson | .......... | G01C 21/206 701/467 |
| 2010/0130131 A1* | 5/2010 | Ha | ...................... | H04M 1/7253 455/41.3 |
| 2010/0182963 A1* | 7/2010 | Fischer | ................. | H04W 48/18 370/329 |
| 2010/0250579 A1* | 9/2010 | Levow | ................. | G06Q 10/107 707/769 |
| 2010/0262651 A1* | 10/2010 | Nguyen | ................ | H04W 88/18 709/203 |
| 2011/0021142 A1* | 1/2011 | Desai | .................... | H04W 8/005 455/41.2 |
| 2011/0171975 A1* | 7/2011 | Yin | ........................ | H04W 8/02 455/456.2 |
| 2011/0307380 A1* | 12/2011 | Ido | ......................... | G06Q 20/40 705/44 |
| 2012/0102409 A1* | 4/2012 | Fan | ........................ | H04W 4/00 715/738 |
| 2012/0142337 A1* | 6/2012 | Wang | ..................... | H04W 24/04 455/424 |
| 2012/0142383 A1* | 6/2012 | Velusamy | ............. | H04H 60/07 455/507 |
| 2012/0196534 A1* | 8/2012 | Kasslin | ................ | H04W 76/002 455/41.2 |
| 2012/0257561 A1* | 10/2012 | Redding | ................ | H04L 12/1827 370/312 |
| 2012/0258665 A1* | 10/2012 | Sip | ........................ | H04W 84/18 455/41.2 |
| 2012/0258669 A1* | 10/2012 | Honkanen | ................ | G01S 3/46 455/67.11 |
| 2012/0272273 A1* | 10/2012 | Grannan | ................ | H04N 5/445 725/50 |
| 2012/0287839 A1* | 11/2012 | Kim | ....................... | H04W 72/005 370/312 |
| 2013/0017816 A1* | 1/2013 | Talty | ..................... | H04W 4/008 455/418 |
| 2013/0109313 A1* | 5/2013 | Kneckt | ................. | H04W 8/005 455/41.2 |

(56) References Cited

U.S. PATENT DOCUMENTS

| | | | |
|---|---|---|---|
| 2013/0109314 A1* | 5/2013 | Kneckt | H04W 4/008 455/41.2 |
| 2013/0144674 A1* | 6/2013 | Kim | G06Q 30/0207 705/7.19 |
| 2013/0176865 A1* | 7/2013 | Boland | H04L 47/2483 370/252 |
| 2013/0188538 A1* | 7/2013 | Kainulainen | G01S 3/48 370/310 |
| 2013/0288604 A1* | 10/2013 | Chang | H04W 84/18 455/41.2 |
| 2013/0331031 A1* | 12/2013 | Palin | H04W 52/0245 455/41.2 |
| 2014/0073252 A1* | 3/2014 | Lee | H04W 4/008 455/41.2 |
| 2014/0089514 A1* | 3/2014 | Messenger | G06Q 30/02 709/227 |
| 2014/0105396 A1* | 4/2014 | Engelien-Lopes | H04W 12/04 380/270 |
| 2014/0106735 A1* | 4/2014 | Jackson | H04W 8/245 455/419 |
| 2014/0143060 A1* | 5/2014 | Fernandez | G06Q 30/0281 705/14.58 |
| 2014/0154986 A1* | 6/2014 | Lee | H04B 7/26 455/41.2 |
| 2014/0157135 A1* | 6/2014 | Lee | G06F 3/0482 715/738 |
| 2014/0160978 A1* | 6/2014 | Palin | H04W 8/005 370/254 |
| 2014/0194062 A1* | 7/2014 | Palin | H04W 4/008 455/41.2 |
| 2014/0244810 A1* | 8/2014 | Chen | H04L 61/2076 709/221 |
| 2014/0266607 A1* | 9/2014 | Olodort | G08B 6/00 340/7.6 |
| 2014/0269272 A1* | 9/2014 | Shuey | G01D 4/004 370/230 |
| 2014/0355582 A1* | 12/2014 | Kamath | H04W 84/20 370/338 |
| 2014/0357192 A1* | 12/2014 | Azogui | H04B 7/26 455/41.2 |
| 2014/0357194 A1* | 12/2014 | Jin | H04W 8/005 455/41.2 |
| 2014/0357269 A1* | 12/2014 | Zhou | H04W 8/005 455/434 |
| 2014/0358685 A1* | 12/2014 | Want | G06Q 30/0261 705/14.58 |
| 2014/0378057 A1* | 12/2014 | Ramon | H04L 9/32 455/41.2 |
| 2015/0006419 A1* | 1/2015 | Pearson | G06Q 10/1053 705/321 |
| 2015/0022382 A1* | 1/2015 | Chettimada | G06F 13/4286 341/24 |
| 2015/0072618 A1* | 3/2015 | Granbery | H04W 4/008 455/41.2 |
| 2015/0079907 A1* | 3/2015 | Engelien-Lopes | H04W 52/0212 455/41.2 |
| 2015/0099469 A1* | 4/2015 | Goldstein | H04L 67/24 455/41.2 |
| 2015/0106183 A1* | 4/2015 | McEvilly | H04W 4/025 705/14.25 |
| 2015/0109978 A1* | 4/2015 | Berntsen | H04W 52/0216 370/311 |
| 2015/0163765 A1* | 6/2015 | Hobbs | H04W 64/00 455/41.2 |
| 2015/0163846 A1* | 6/2015 | Weizman | H04W 76/043 455/41.2 |
| 2015/0168182 A1* | 6/2015 | Deguchi | G06F 17/30749 702/187 |
| 2015/0172391 A1* | 6/2015 | Kasslin | H04L 67/16 370/338 |
| 2015/0172934 A1* | 6/2015 | Engelien-Lopes | H04W 84/20 370/252 |
| 2015/0245163 A1* | 8/2015 | Candelore | H04W 4/008 455/456.1 |
| 2015/0276432 A1* | 10/2015 | Repyevsky | G05B 19/048 340/870.03 |
| 2015/0282088 A1* | 10/2015 | Weizman | H04W 52/0245 455/41.2 |
| 2015/0341464 A1* | 11/2015 | Adisesha | H04L 67/30 709/204 |
| 2015/0341804 A1* | 11/2015 | Syrjarinne | H04B 7/0689 370/252 |
| 2016/0014809 A1* | 1/2016 | Kneckt | H04W 74/002 370/312 |

* cited by examiner

METHOD OF SEARCHING FOR DEVICE BETWEEN ELECTRONIC DEVICES

CROSS-REFERENCE TO RELATED APPLICATION(S)

This application claims the benefit under 35 U.S.C. §119 (a) of a Korean patent application filed on Feb. 23, 2014 in the Korean Intellectual Property Office and assigned Serial number 10-2014-0021013, the entire disclosure of which is hereby incorporated by reference.

TECHNICAL FIELD

The present disclosure relates to a method of searching for an electronic device between electronic devices.

BACKGROUND

An electronic device may search for a neighboring electronic device or advertise a signal for data transmission with another electronic device under multicast or broadcast environments. The electronic device transmitting the advertised signal may receive a reply signal corresponding to the advertised signal from another neighboring electronic device.

When an electronic device transmits/receives signals to/from another neighboring electronic device under multicast or broadcast environments, the reliability of data transfer is not guaranteed, such that data duplication or loss may occur. Additionally, since there may be a plurality of electronic devices in a predetermined space and due to repetitive data transmission, an overall network communication efficiency may be reduced.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method of searching for an electronic device between electronic devices.

In accordance with an aspect of the present disclosure, a method of searching for an electronic device between electronic devices is provided. The method includes advertising, by a first electronic device, a request signal, receiving, by the first electronic device, a response signal from a second electronic device having received the request signal, updating, by the first electronic device, the request signal to include identification information identifying at least part of the second electronic device, advertising, by the first electronic device, the updated request signal, and receiving, by the first electronic device, the response signal from the at least part of the second electronic device.

In accordance with another aspect of the present disclosure, a method of searching for an electronic device between electronic devices is provided. The method includes receiving, by a second electronic device, a request signal from a first electronic device, advertising, by the second electronic device, a response signal including identification information, receiving, by the second electronic device, an updated request signal from the first electronic device, checking, by the second electronic device, whether identification information identifying the second electronic device is included in the updated request signal, and when the identification information identifying the second electronic device is not included in the updated request signal, advertising, by the second electronic device, the response signal.

In accordance with another aspect of the present disclosure, an electronic device is provided. The electronic device includes a communication interface and a processor, wherein the communication interface is configured to advertise a request signal and to receive a response signal from another electronic device having received the request signal, wherein the processor is configured to update the request signal to include identification information identifying at least part of the other electronic device, and wherein the communication interface is further configured to advertise the updated request signal and to receive the response signal from the at least part of the other electronic device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
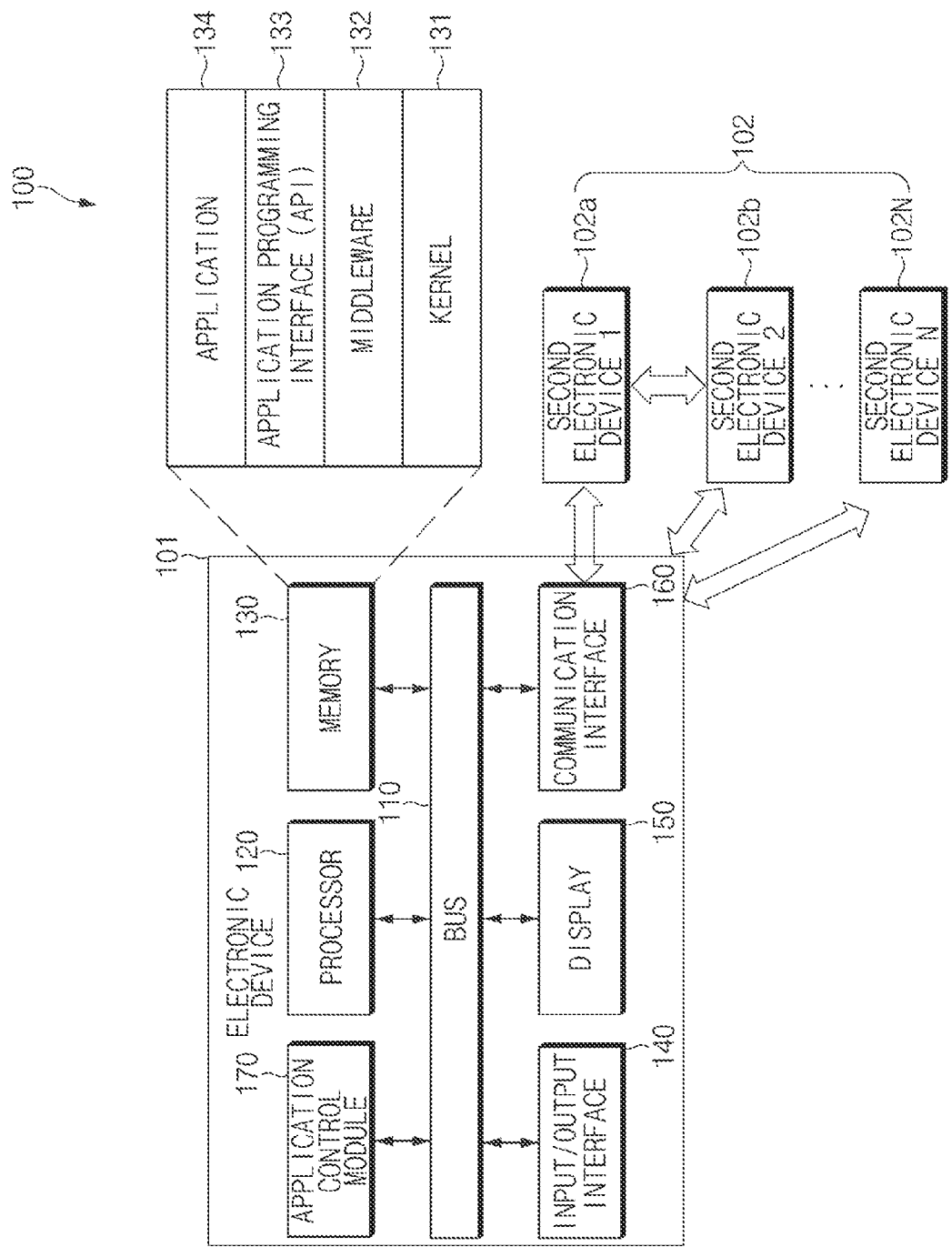
FIG. 1 is a block diagram illustrating a network including a first electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms "include," "comprise," "have," "may include," "may comprise" and/or "may have" used herein may indicate disclosed functions, operations, or existence of elements but do not exclude other functions, operations or elements. Additionally, in this specification, the terms "include," "comprise," "including," and/or "comprising," may specify a property, a region, a fixed number, a step, a process, an element and/or a component but do not exclude other properties, regions, fixed numbers, steps, processes, elements and/or components.

The meaning of the term "or" used herein includes any or all combinations of the words connected by the term "or". For instance, the expression "A or B" may indicate include A, B, or both A and B.

The terms such as "$1^{st}$," "$2^{nd}$," "first," "second," and the like used herein may refer to modifying various different elements of various embodiments of the present disclosure, but do not limit the elements. For instance, such terms do not limit the order and/or priority of the elements. Furthermore, such terms may be used to distinguish one element from another element. For instance, both "a first user device" and "a second user device" indicate a user device but indicate different user devices from each other. For example, a first component may be referred to as a second component and vice versa without departing from the scope of the present disclosure.

In the present disclosure, when one part (or element, device, etc.) is referred to as being "connected" to another part (or element, device, etc.), it should be understood that the former can be "directly connected" to the latter, or "electrically connected" to the latter via an intervening part (or element, device, etc.). In contrast, when an element is referred to as being "directly connected" or "directly coupled" to another element, there are no intervening elements present.

Terms used in this specification are used to describe specific embodiments, and are not intended to limit the scope of the present disclosure. The terms of a singular form may include plural forms unless they have a clearly different meaning in the context.

Unless otherwise defined herein, all the terms used herein, which include technical or scientific terms, may have the same meaning that is generally understood by a person skilled in the art. It will be further understood that terms, which are defined in the dictionary and are commonly used, should also be interpreted as is customary in the relevant related art and not in an idealized or overly formal sense unless expressly so defined herein in various embodiments of the present disclosure.

An electronic device according to various embodiments of the present disclosure may have a communication function. For instance, electronic devices may include at least one of smartphones, tablet personal computers (PCs), mobile phones, video phones, electronic book (e-book) readers, desktop PCs, laptop PCs, netbook computers, personal digital assistants (PDAs), portable multimedia player (PMPs), MP3 players, mobile medical devices, cameras, and wearable devices (e.g., head-mounted-devices (HMDs) such as electronic glasses, electronic apparel, electronic bracelets, electronic necklaces, electronic accessories, electronic tattoos, and smart watches).

According to various embodiments of the present disclosure, an electronic device may be smart home appliances having a communication function. The smart home appliances may include at least one of, for example, televisions, digital video disk (DVD) players, audio players, refrigerators, air conditioners, cleaners, ovens, microwave ovens, washing machines, air cleaners, set-top boxes, television (TV) boxes (e.g., Samsung HomeSync™, Apple TV™ or Google TV™), game consoles, electronic dictionaries, electronic keys, camcorders, and electronic picture frames.

According to various embodiments of the present disclosure, an electronic device may include at least one of various medical devices (for example, magnetic resonance angiography (MRA) devices, magnetic resonance imaging (MRI) devices, computed tomography (CT) devices, medical imaging devices, ultrasonic devices, etc.), navigation devices, global positioning system (GPS) receivers, event data recorders (EDRs), flight data recorders (FDRs), vehicle infotainment devices, marine electronic equipment (for example, marine navigation systems, gyro compasses, etc.), avionics, security equipment, car head units, industrial or household robots, financial institutions' automatic teller's machines (ATMs), and stores' point of sales (POS).

According to an embodiment of the present disclosure, an electronic device may include at least one of furniture or buildings/structures having a communication function, electronic boards, electronic signature receiving devices, projectors, and various measuring instruments (for example, water, electricity, gas, or radio signal measuring instruments). An electronic device according to an embodiment of the present disclosure may be one of the above-mentioned various devices or a combination thereof. Additionally, an electronic device according to an embodiment of the present disclosure may be a flexible device. Furthermore, it is apparent to those skilled in the art that an electronic device according to an embodiment of the present disclosure is not limited to the above-mentioned devices.

Hereinafter, a connecting member applied to an electronic device and an electronic device according to various embodiments of the present disclosure will be described in more detail with reference to the accompanying drawings. The term "user" in various embodiments of the present disclosure may refer to a person using an electronic device or a device using an electronic device (for example, an artificial intelligent electronic device).

FIGS. 1 through 7, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the present disclosure. Terms first, second, and the like are used to differentiate between objects having the same terminology and are in no way intended to represent a chronological order, unless where explicitly stated otherwise. A set is defined as a non-empty set including at least one element.

FIG. 1 is a view illustrating a network environment including a first electronic device according to an embodiment of the present disclosure.

Referring to FIG. 1, a network environment 100 is illustrated, where the network environment 100 may include a first electronic device 101 including a bus 110, a processor 120, a memory 130, an input/output interface 140, a display 150, a communication interface 160, and an application control module 170.

The bus 110 may be a circuit connecting the above-mentioned components to each other and delivering a communication signal (for example, a control message) therebetween.

The processor 120, for example, receives an instruction from the above other components (for example, the memory 130, the input/output interface 140, the display 150, the communication interface 160, or the application control module 170) through the bus 110, interprets the received instruction, and performs operations and data processing in response to the interpreted instruction.

The memory 130 may store an instruction or data received from the processor 120 or other components (for example, the input/output interface 140, the display 150, the communication interface 160, or the application control module 170) or an instruction or data generated from the processor 120 or other components. The memory 130, for example, may include programming modules, for example, a kernel 131, a middleware 132, an application programming interface (API) 133, and an application 134. Each of the above-mentioned programming modules may be configured with software, firmware, hardware, or a combination thereof.

The kernel 131 may control or manage system resources (for example, the bus 110, the processor 120, or the memory 130) used for performing operations or functions implemented by the remaining other programming modules, for example, the middleware 132, the API 133, or the application 134. Additionally, the kernel 131 may provide an interface for accessing an individual component of the electronic device 101 from the middleware 132, the API 133, or the application 134 and controlling or managing the individual component.

The middleware 132 may serve as an intermediary role for exchanging data between the API 133 or the application 134 and the kernel 131 through communication. Additionally, in relation to job requests received from the application 134, or the middleware 132 may perform a control (for example, scheduling or load balancing) for the job requests by using a method of assigning a priority for using a system resource (for example, the bus 110, the processor 120, or the memory 130) of the electronic device 101 to at least one application 134 among various applications.

The API 133, as an interface through which the application 134 controls a function provided from the kernel 131 or the middleware 132, may include at least one interface or function (for example, an instruction) for file control, window control, image processing, or character control.

According to various embodiments of the present disclosure, the application 134 may include a short message service (SMS)/multimedia messaging service (MMS) application, an e-mail application, a calendar application, an alarm application, a health care application (for example, an application for measuring an exercise amount or blood sugar), or an environmental information application (for example, an application for providing pressure, moisture, or temperature information). Additionally or alternatively, the application 134 may be an application relating to information exchange between the first electronic device 101 and an external electronic device (for example, an electronic device 102). The application relating to information exchange, for example, may include a notification relay application for delivering specific information to the external electronic device or a device management application for managing the external electronic device.

For example, the notification relay application may have a function for delivering to an external electronic device (for example, the first electronic device 101 or the second electronic device 102) notification information occurring from another application (for example, an SMS/MMS application, an e-mail application, a health care application, or an environmental information application) of the first electronic device 101. Additionally or alternatively, the notification relay application may receive notification information from an external electronic device (for example, the second electronic device 102) and may then provide the received notification information to a user. The device management application, for example, may manage (for example, install, delete, or update) a function (for example, turning on/off an external electronic device itself (or some components) or adjusting the brightness (or resolution) of a display) for at least part of an external electronic device (for example, the second electronic device 102) communicating with the first electronic device 101, an application operating in the external electronic device, or a service (for example, a call service or a message service) provided from the external electronic device.

According to various embodiments of the present disclosure, the application 134 may include an application specified according to the attribute (for example, a type of an electronic device) of the external electronic device (for example, the second electronic device 102). For example, when an external electronic device is an MP3 player, the application 134 may include an application relating to music playback. Similarly, when an external electronic device is a mobile medical device, the application 134 may include an application relating to heath care. According to an embodiment of the present disclosure, the application 134 may include at least one of an application specified to the first electronic device 101 or an application received from an external electronic device (for example, the second electronic device 102).

The input/output interface 140 may deliver an instruction or data inputted from a user through an input/output device (for example, a sensor, a keyboard, or a touch screen), to the processor 120, the memory 130, the communication interface 160, or the application control module 170 through the bus 110. For example, the input/output interface 140 may provide data on a user's touch inputted through a touch screen to the processor 120. Additionally, the input/output interface 140 may output an instruction or data received from the processor 120, the memory 130, the communication interface 160, or the application control module 170 through the bus 110, through the input/output device (for example, a speaker or a display). For example, the input/output interface 140 may output voice data processed through the processor 120 to a user through a speaker.

The display 150 may display a variety of information (for example, multimedia data or text data) to a user.

The communication interface 160 may connect a communication between the first electronic device 101 and an external device (for example, the second electronic device 102). For example, the communication interface 160 may communicate with the external device in connection to the network 162 through wireless communication or wired communication. The wireless communication may include at least one of wireless fidelity (Wi-Fi), Bluetooth (BT), near field communication (NFC), GPS, or cellular communication (for example, long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM)). The wired communication may include at least one of universal serial bus (USB), high definition multimedia interface (HDMI), recommended standard 232 (RS-232), or plain old telephone service (POTS), for example.

According to an embodiment of the present disclosure, the network 162 may be a telecommunications network. The telecommunications network may include at least one of a computer network, the Internet, the Internet of things, or a telephone network. According to an embodiment of the present disclosure, a protocol (for example, transport layer protocol, data link layer protocol, or physical layer protocol) for communication between the first electronic device 101 and an external device may be supported by at least one of the application 134, the application programming interface 133, the middleware 132, the kernel 131, or the communication interface 160.

The application control module 170 may process at least part of information obtained from other components (for example, the processor 120, the memory 130, the input/output interface 140, or the communication interface 160) and may output it to a user through various methods. For example, the application control module 170 may select an appropriate application from a plurality of applications stored in the memory 130 based on user information received through the input/output interface 140. The selected application may provide appropriate service to a user of the first electronic device 101 based on data obtained from at least one sensor or the second electronic device 102 including an external device through the network 100. Additionally, the application control module 170 may select or control an appropriate application in order to obtain information from various sensors or components mounted on the first electronic device 101, or process information obtained therefrom. A configuration of the first electronic device 101 including various sensors and/or modules will be later described with reference to FIG. 2.

Under a multicast environment or a broadcast environment, the first electronic device 101 and the second electronic device 102 may search for the other party device or may transmit/receive data to/from the other device. Each of the first electronic device 101 and the second electronic device 102 may advertise (for example, transmit signals to a plurality of electronic devices positioned in a predetermined space on the basis of one electronic device) a request signal to another electronic device located in a predetermined space. An electronic device receiving the request signal may advertise a response signal to the other electronic device.

Hereinafter, a method of advertising a request signal through the first electronic device 101, searching for a device by advertising a response signal through the second electronic device 102 receiving the request signal, or transmitting/receiving data will be mainly described.

Under the multicast environment or the broadcast environment, the first electronic device 101 may advertise a request signal to check whether the second electronic device 102 is located in a predetermined space. The second electronic device 102 may advertise a response signal in response to a corresponding signal. If the second electronic device 102 is more than one (e.g., the second electronic device 102 may include up to N second electronic devices 102N), the first electronic device 101 may receive a large amount of packets for a predetermined time. For example, the first electronic device 101 may receive a relatively large amount of packets from a second electronic device1 102a close to the first electronic device 101 and may receive a relatively small amount of packets from a second electronic device2 102b, which is farther from the first electronic device 101 than the second electronic device 1 102a. Additionally, a significant portion of a packet that the first electronic device 101 receives from the second electronic device1 102a may correspond to an overlapping request signal. The first electronic device 101 may be interrupted in receiving a request signal advertised from the second electronic device2 102b due to the overlapping request signal received from the second electronic device1 102a.

The first electronic device 101 may limit the packet transmission of the second electronic device1 102a having a relatively strong intensity of a response signal and may repeatedly receive a packet of the second electronic device2 102b having a relatively weak intensity of a response signal, thereby efficiently searching for a neighboring second electronic device 102. Hereinafter, a method of the first electronic device 101 to limit at least part of packet transmission of the second electronic device 102 in order for the search of the second electronic device 102 will be mainly described.

Figure 2:
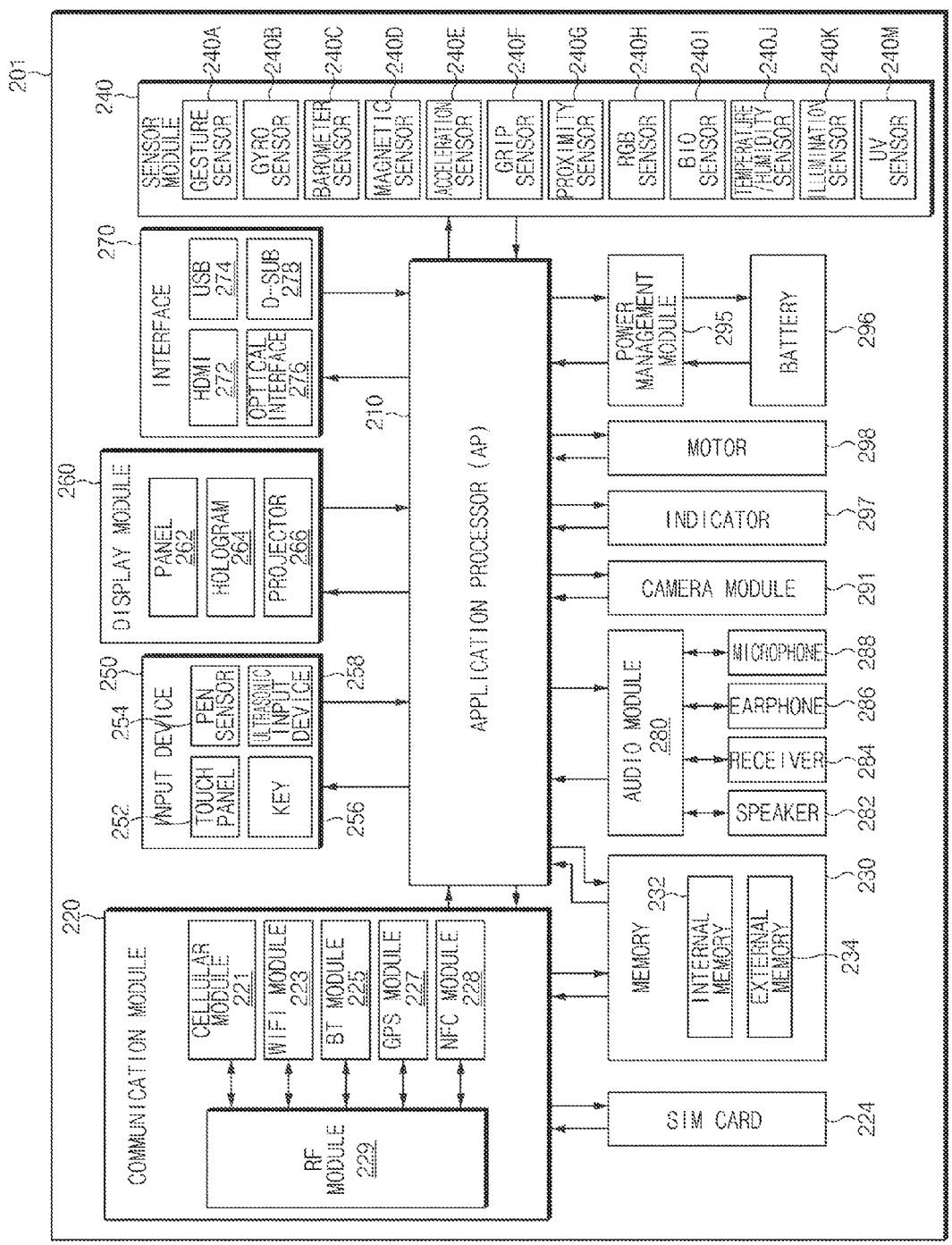
FIG. 2 is a block diagram illustrating an electronic device according to an embodiment of the present disclosure.

FIG. 2 is a block diagram illustrating an electronic device according to an embodiment of the present disclosure. For example, an electronic device 201, as illustrated in FIG. 2, may configure all or part of the above-mentioned electronic devices 101 or 102 as shown in FIG. 1.

Referring to FIG. 2, the electronic device 201 is illustrated, where the electronic device 201 may include at least one application processor (AP) 210, a communication module 220, a subscriber identification module (SIM) card 224, a memory 230, a sensor module 240, an input device 250, a display module 260, an interface 270, an audio module 280, a camera module 291, a power management module 295, a battery 296, an indicator 297, and a motor 298.

The AP 210 may control a plurality of hardware or software components connected to the AP 210 and also may perform various data processing and operations with multimedia data by executing an operating system or an application program. The AP 210 may be implemented with a system on chip (SoC), for example. According to an embodiment of the present disclosure, the AP 210 may further include a graphic processing unit (GPU) (not shown).

The communication module 220 (for example, the communication interface 160 of FIG. 1) may perform data transmission through a communication between other electronic devices (for example, the second electronic device 102 of FIG. 1) connected to the electronic device 201 (for example, the first electronic device 101 of FIG. 1) via a network. According to an embodiment of the present disclosure, the communication module 220 may include a cellular module 221, a Wi-Fi module 223, a BT module 225, a GPS module 227, an NFC module 228, and a radio frequency (RF) module 229.

The cellular module 221 may provide voice calls, video calls, text services, or Internet services through a communication network (for example, LTE, LTE-A, CDMA, WCDMA, UMTS, WiBro, or GSM). The cellular module 221 may perform a distinction and authentication operation on an electronic device in a communication network by using a SIM (for example, the SIM card 224), for example. According to an embodiment of the present disclosure, the cellular module 221 may perform at least part of a function that the AP 210 provides. For example, the cellular module 221 may perform at least part of a multimedia control function.

According to an embodiment of the present disclosure, the cellular module 221 may further include a communication processor (CP). Additionally, the cellular module 221 may be implemented with SoC, for example. As shown in FIG. 2, components such as the cellular module 221 (for example, a CP), the memory 230, or the power management module 295 are separated from the AP 210, but according to an embodiment of the present disclosure, the AP 210 may be implemented including some of the above-mentioned components (for example, the cellular module 221).

According to an embodiment of the present disclosure, the AP 210 or the cellular module 221 (for example, a CP) may load instructions or data, which are received from a nonvolatile memory or at least one of other components connected thereto, into a volatile memory and then may process them. Furthermore, the AP 210 or the cellular module 221 may store data received from or generated by at least one of other components in a nonvolatile memory.

Each of the Wi-Fi module 223, the BT module 225, the GPS module 227, and the NFC module 228 may include a processor for processing data transmitted/received through a corresponding module. Although the cellular module 221, the Wi-Fi module 223, the BT module 225, the GPS module 227, and the NFC module 228 are shown as separate blocks in FIG. 2, according to an embodiment of the present disclosure, some (for example, at least two) of the cellular module 221, the Wi-Fi module 223, the BT module 225, the GPS module 227, and the NFC module 228 may be included in one integrated chip (IC) or an IC package. For example, at least some (for example, a CP corresponding to the cellular module 221 and a Wi-Fi processor corresponding to the Wi-Fi module 223) of the cellular module 221, the Wi-Fi module 223, the BT module 228, the GPS module 227, and the NFC module 228 may be implemented with one SoC.

The RF module 229 may be responsible for data transmission, for example, the transmission of an RF signal. Although not shown in the drawings, the RF module 229 may include a transceiver, a power amp module (PAM), a frequency filter, or a low noise amplifier (LNA). Additionally, the RF module 229 may further include components for transmitting/receiving electromagnetic waves on a free space in a wireless communication, for example, conductors or conducting wires. Although the cellular module 221, the Wi-Fi module 223, the BT module 225, the GPS module 227, and the NFC module 228 share one RF module 229 shown in FIG. 2, according to an embodiment of the present disclosure, at least one of the cellular module 221, the Wi-Fi module 223, the BT module 225, the GPS module 227, and the NFC module 228 may perform the transmission of an RF signal through an additional RF module.

The SIM card 224 may be a card including a subscriber identification module and may be inserted into a slot formed at a specific position of an electronic device. The SIM card 224 may include unique identification information (for example, an integrated circuit card identifier (ICCID)) or subscriber information (for example, an international mobile subscriber identity (IMSI)).

The memory 230 (for example, the memory 130 of FIG. 1) may include an internal memory 232 or an external memory 234. The internal memory 232 may include at least one of a volatile memory (for example, dynamic random access memory (DRAM), static RAM (SRAM), synchronous DRAM (SDRAM)) and a non-volatile memory (for example, one time programmable read only memory (OTPROM), PROM, erasable and programmable ROM (EPROM), electrically erasable and programmable ROM (EEPROM), mask ROM, flash ROM, not and (NAND) flash memory, and not or (NOR) flash memory).

According to an embodiment of the present disclosure, the internal memory 232 may be a Solid State Drive (SSD). The external memory 234 may further include a flash drive, for example, a compact flash (CF) drive, a secure digital (SD) drive, a Micro-SD drive, a Mini-SD drive, an extreme digital (xD) drive, or a memory stick. The external memory 234 may be functionally connected to the electronic device 201 through various interfaces. According to an embodiment of the present disclosure, the electronic device 201 may further include a storage device (or a storage medium) such as a hard drive.

The sensor module 240 measures physical quantities or detects an operating state of the electronic device 201, thereby converting the measured or detected information into electrical signals. The sensor module 240 may include at least one of a gesture sensor 240A, a gyro sensor 240B, a pressure (barometer) sensor 240C, a magnetic sensor 240D, an acceleration sensor 240E, a grip sensor 240F, a proximity sensor 240G, a color sensor 240H (for example, a red, green, blue (RGB) sensor), a bio sensor 240I, a temperature/humidity sensor 240J, an illumination sensor 240K, and an ultra violet (UV) sensor 240M. Additionally/alternatively, the sensor module 240 may include an E-nose sensor (not shown), an electromyography (EMG) sensor, an electroencephalogram (EEG) sensor (not shown), an electrocardiogram (ECG) sensor (not shown), an infrared (IR) sensor (not shown), an iris sensor (not shown), or a fingerprint sensor (not shown). The sensor module 240 may further include a control circuit for controlling at least one sensor therein.

The user input device 250 may include a touch panel 252, a (digital) pen sensor 254, a key 256, and/or an ultrasonic input device 258. The touch panel 252 may recognize a touch input through at least one of capacitive, resistive, infrared, or ultrasonic methods, for example. Additionally, the touch panel 252 may further include a control circuit. In the capacitive method, both direct touch and proximity recognition are possible. The touch panel 252 may further include a tactile layer. In this case, the touch panel 252 may provide a tactile response to a user.

The (digital) pen sensor 254 may be implemented through a method similar or identical to that of receiving a user's touch input or an additional sheet for recognition. The key 256 may include a physical button, a touch key, an optical key, or a keypad, for example. The ultrasonic input device 258, as a device checking data by detecting sound waves through a microphone (for example, microphone 288) in the electronic device 201, may provide wireless recognition through an input tool generating ultrasonic signals. According to an embodiment of the present disclosure, the electronic device 201 may receive a user input from an external device (for example, a computer or a server) connected to the electronic device 201 through the communication module 220.

The display module 260 (for example, the display 150 of FIG. 1) may include a panel 262, a hologram device 264, and/or a projector 266. The panel 262 may include a liquid-crystal display (LCD) or an active-matrix organic light-emitting diode (AM-OLED). The panel 262 may be implemented to be flexible, transparent, or wearable, for example. The panel 262 and the touch panel 252 may be configured with one module. The hologram 264 may show three-dimensional images in the air by using the interference of light. The projector 266 may display an image by projecting light on a screen. The screen, for example, may be placed inside or outside the electronic device 201. According to an embodiment of the present disclosure, the display module 260 may further include a control circuit for controlling the panel 262, the hologram device 264, or the projector 266.

The interface 270 may include an HDMI 272 connection, a USB 274 connection, an optical interface 276, or a D-subminiature (D-sub) 278 interface, for example. The interface 270 may be included in the communication interface 160, as shown in FIG. 1, for example. Additionally/alternatively, the interface 270 may include a mobile high-definition link (MHL) interface, an SD card/multi-media card (MMC) interface, or an infrared data association (IrDA) standard interface.

The audio module 280 may convert sound and electrical signals in both directions. At least some components of the audio module 280 may be included in the input/output interface 140, as shown in FIG. 1, for example. The audio module 280 may process sound information inputted/outputted through a speaker 282, a receiver 284, an earphone 286, and/or the microphone 288.

The camera module 291, as a device for capturing a still image and a video, may include at least one image sensor (for example, a front sensor or a rear sensor), a lens (not shown), an image signal processor (ISP) (not shown), or a flash (not shown) (for example, an LED or a xenon lamp).

The power management module 295 may manage the power of the electronic device 201. Although not shown in the drawings, the power management module 295 may include a power management IC (PMIC), a charger IC, or a battery or fuel gauge, for example.

The PMIC may be built in an IC or SoC semiconductor, for example. A charging method may be classified into a wired method and a wireless method. The charger IC may charge a battery and may prevent overvoltage or overcurrent flow from a charger. According to an embodiment of the present disclosure, the charger IC may include a charger IC for at least one of a wired charging method and a wireless charging method. As the wireless charging method, for example, there is a magnetic resonance method, a magnetic induction method, or an electromagnetic method. An additional circuit for wireless charging, for example, a circuit such as a coil loop, a resonant circuit, or a rectifier circuit, may be added.

The battery gauge may measure the remaining amount of the battery 296, or a voltage, current, or temperature of the battery 296 during charging. The battery 296 may store or generate electricity and may supply power to the electronic device 201 by using the stored or generated electricity. The battery 296, for example, may include a rechargeable battery or a solar battery.

The indicator 297 may display a specific state of the electronic device 201 or part thereof (for example, the AP 210), for example, a booting state, a message state, or a charging state. The motor 298 may convert electrical signals into mechanical vibration. Although not shown in the drawings, the electronic device 201 may include a processing device (for example, a GPU) for mobile TV support. A processing device for mobile TV support may process media data according to the standards such as digital multimedia broadcasting (DMB), digital video broadcasting (DVB), or media flow.

Each of the above-mentioned components of the electronic device according to various embodiments of the present disclosure may be configured with at least one component and the name of a corresponding component may vary according to the kind of an electronic device. An electronic device according to an embodiment of the present disclosure may be configured including at least one of the above-mentioned components or additional other components. Additionally, some components of an electronic device according to an embodiment of the present disclosure are combined and configured as one entity, so that functions of previous corresponding components are performed identically.

The term "module" used in this disclosure, for example, may mean a unit including a combination of at least one of hardware, software, and firmware. The term "module" and the term "unit," "logic," "logical block," "component," and/or "circuit" may be interchangeably used. "Module" may be a minimum unit or part of an integrally configured component. "Module" may be a minimum unit performing at least one function or part thereof "Module" may be implemented mechanically or electronically. For example, "module" used in this disclosure may include at least one of an application-specific IC (ASIC) chip performing certain operations, field-programmable gate arrays (FPGAs), or a programmable-logic device, all of which are known or to be developed in the future.

According to various embodiments of the present disclosure, the electronic device 201 includes the communication interface 160 and the processor 120, as illustrated in FIG. 1. The communication interface 160 advertises a request signal. The communication interface 160 receives a response signal from another electronic device receiving the request signal. The processor 120 updates the request signal to include identification information identifying at least part of the other electronic device. The communication interface 160 advertises the updated request signal and receives the response signal from part of the other electronic device.

Figure 3:
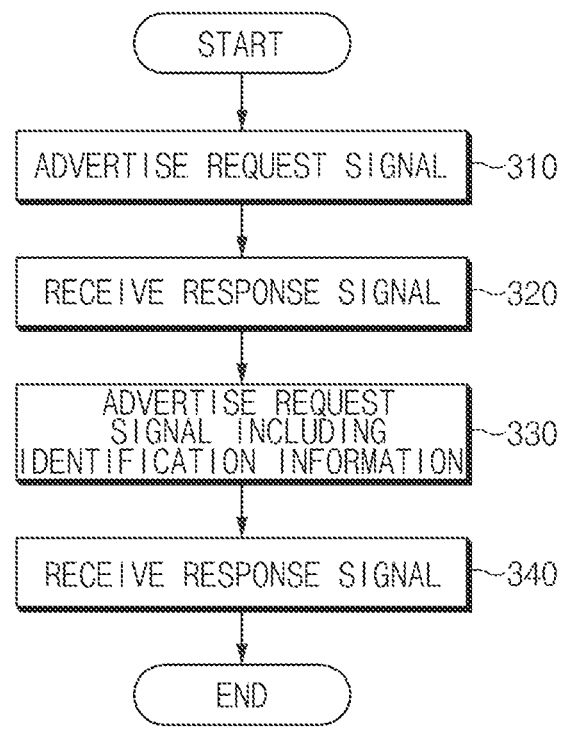
FIG. 3 is a view illustrating a device search process according to an embodiment of the present disclosure.

FIG. 3 is a view illustrating a device search process according to an embodiment of the present disclosure.

Referring to FIG. 3, the first electronic device 101, as illustrated in FIG. 1, may advertise a signal (hereinafter referred to as a request signal) requesting specified information from a neighboring electronic device (for example, the second electronic device 102, as illustrated in FIG. 1) in operation 310. The request signal may be a message transmitted to a plurality of unspecified second electronic devices 102 around the first electronic device 101. The first electronic device 101 may advertise a request signal to start searching for the second electronic device 102.

According to various embodiments of the present disclosure, in operation 320, the first electronic device 101 may receive a response signal advertised from the second electronic device 102 receiving the request signal. The response signal may be a signal notifying that the second electronic device 102 is located within a communication available range of the first electronic device 101. According to an embodiment of the present disclosure, the response signal may include identification information identifying the second electronic device 102 receiving a request signal. The identification information may be a unique identifier for identifying a specific second electronic device 102 from another electronic device on a network. According to various embodiments of the present disclosure, the identification information may be device information, for example, the media access control (MAC) address or identification (ID) of the second electronic device 102.

In operation 330, the first electronic device 101 may advertise a request signal including identification information of at least part of the second electronic device 102. When receiving identification information from at least part of the second electronic device 102, the first electronic device 101 may update the request signal to include the identification information. According to various embodiments of the present disclosure, the first electronic device 101 may advertise the updated request signal including identification information and the second electronic device 102 may check identification information in the updated request signal and determine whether to transmit a response signal continuously. For example, when the identification information identifying the second electronic device 102 itself is included in the updated request signal, the second electronic device 102 may limit or stop advertising a response signal.

According to an embodiment of the present disclosure, the first electronic device 101 determines at least part of the second electronic device 102 according to a specified condition and may include the identification information identifying the at least part in a request signal. The at least part may be an electronic device that does not need to receive an additional request signal by sufficiently receiving packets necessary for a device search through the first electronic device 101. The first electronic device 101 may limit advertising an additional response signal from the at least part to improve the efficiency of communication with another second electronic device 102.

In operation 340, the first electronic device 101 may receive a response signal continuously from the remaining second electronic device 102 except for at least part of the second electronic device 102 determined in operation 330. The first electronic device 101 may limit advertising an additional response signal to the second electronic device 102 that sufficiently transmits packets necessary for a device search in response to the updated request signal. On the other hand, the first electronic device 101 may continuously advertise a response signal to the second electronic device 102 that insufficiently transmits packets necessary for a device search.

Figure 4:
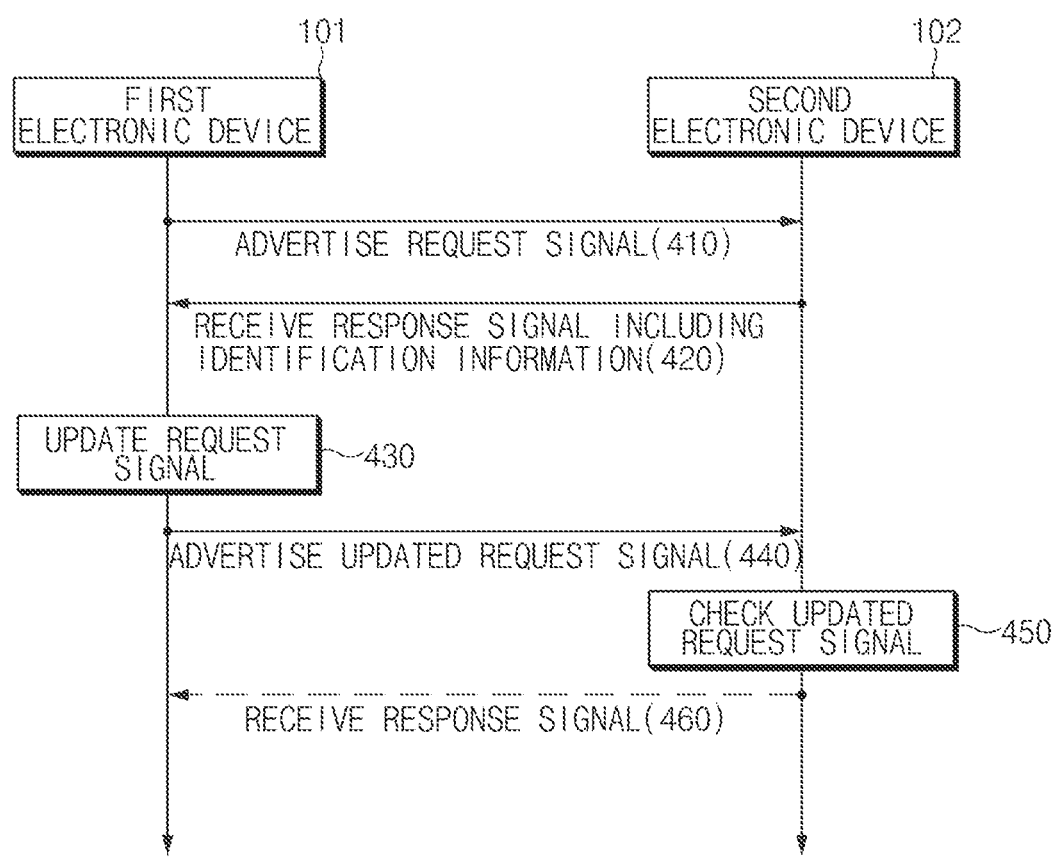
FIG. 4 is a view illustrating a device search process according to an embodiment of the present disclosure.

FIG. 4 is a view illustrating a device searching process according to an embodiment of the present disclosure.

Referring to FIG. 4, the first electronic device 101, as illustrated in FIG. 1, may advertise a request signal in operation 410. The first electronic device 101 may start searching for the neighboring second electronic device 102, as illustrated in FIG. 1, by advertising a request signal.

According to various embodiments of the present disclosure, the first electronic device 101 may receive a response signal including identification information from the second electronic device 102 receiving the request signal in operation 420. The second electronic device 102 may advertise a response signal in response to a request signal received from the first electronic device 101. The response signal may include identification information identifying the second electronic device 102. For example, the response signal may include the MAC address of the second electronic device 102.

In operation 430, the first electronic device 101 may update the request signal to include identification information identifying at least part of the second electronic device 102. The at least part may be an electronic device that does not need to receive an additional request signal by sufficiently receiving packets necessary for a device search through the first electronic device 101. The first electronic device 101 may determine at least part of the second electronic device 102 that does not need to advertise an additional response signal according to a specified condition.

According to various embodiments of the present disclosure, the first electronic device 101 may determine the at least part based on an intensity of a response signal received from the second electronic device 102. The intensity of the response signal may be determined according to the amount of packets received by the first electronic device 101 for a predetermined time. For example, the first electronic device 101 may determine a second electronic device transmitting a response signal of more than a predetermined reference intensity as the at least part. The first electronic device 101 may compare the amount of response signals received from the second electronic device 102 and the amount of reference packets (for example, 50 Bytes) for a predetermined time (for example, 160 ms). When the first electronic device 101 receives request signals of 60 Bytes, 50 Bytes, and 40 Bytes respectively from the second electronic device1 120a, the second electronic device2 102b, and a second electronic device3 102c, as illustrated in FIG. 1, the first electronic device 101 may determine the second electronic device1 102a and the second electronic device2 102b receiving a packet of more than 50 Bytes that is the amount of reference packet, as the at least part. The first electronic device 101 may update a request signal to include the identification information identifying the second electronic device1 102a and the second electronic device2 102b.

According to various embodiments of the present disclosure, the first electronic device 101 may determine the at least part based on the intensity of a response signal received from the second electronic device 102. The intensity of the response signal may be determined according to the number of packets received by the first electronic device 101 for a predetermined time.

For example, the first electronic device 101 may determine a second electronic device transmitting a response signal of more than a predetermined reference intensity as the at least part. The first electronic device 101 may compare the amount of response signals received from the second electronic device 102 and the number of reference packets (for example, 6) for a predetermined time (for example, 160 ms). When the first electronic device 101 receives 10, 5, and 8 request signals respectively from the second electronic device1 120a, the second electronic device2 102b, and the second electronic device3 102c, the first electronic device 101 may determine the second electronic device1 102a and the third electronic device3 102c receiving more than 6 packets that is the number of reference packets, as the at least part. The first electronic device 101 may update a request signal to include the identification information identifying the second electronic device1 102a and the second electronic device3 102c.

According to an embodiment of the present disclosure, the first electronic device 101 may determine a predetermined number of parts in the second electronic device 102 according to the intensity of a response signal. For example, the first electronic device 101 may update a request signal to include identification information identifying four second electronic devices having the strongest intensity of a signal in the neighboring second electronic device 102. According to another embodiment of the present disclosure, the first electronic device 101 may determine a predetermined ratio of the second electronic device 102 as the at least part according to the intensity of a response signal. For example, the first electronic device 101 may update a request signal to include identification information identifying second electronic devices of 60% having the strongest intensity of a signal in the second electronic device 102.

In operation 440, the first electronic device 101 may advertise the updated request signal. The updated request signal may include identification information identifying at least part of the second electronic device 102.

In operation 450, the second electronic device 102 may determine whether to advertise a response signal continuously by checking the updated request signal. The second electronic device 102 may check from a request signal whether the identification information identifying the second electronic device 102 is included in a specific field (hereinafter referred to as a reception rejection field) where the identification information identifying the second electronic device 102 is stored. When the identifier of the second electronic device 102 is not included in the reception rejection field, the second electronic device 102 determines that the intensity of a response signal advertised by the second electronic device 102 is weaker than those of others and may advertise a response signal continuously. On the other hand, when the identifier of the second electronic device 102 is included in the reception rejection field, the second electronic device 102 determines that the intensity of a response signal advertised by the second electronic device 102 is stronger than those of others and may stop advertising a response signal.

In operation 460, the first electronic device 101 may receive the response signal from the second electronic device 102 under a specified condition. The first electronic device 101 may receive a response signal from the second electronic device 102 whose identification information is not included in the updated request signal. The first electronic device 101 may continuously receive a response signal from the second electronic device 102 whose response signal is relatively weak.

Figure 5A:
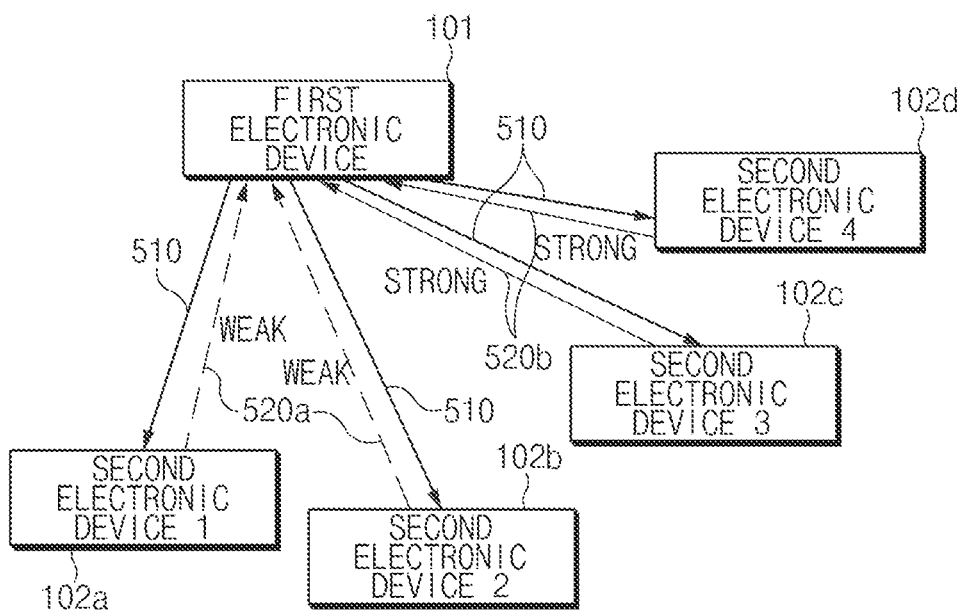
FIGS. 5A and 5B are views illustrating a signal transmission between electronic devices according to various embodiments of the present disclosure.
Figure 5B:
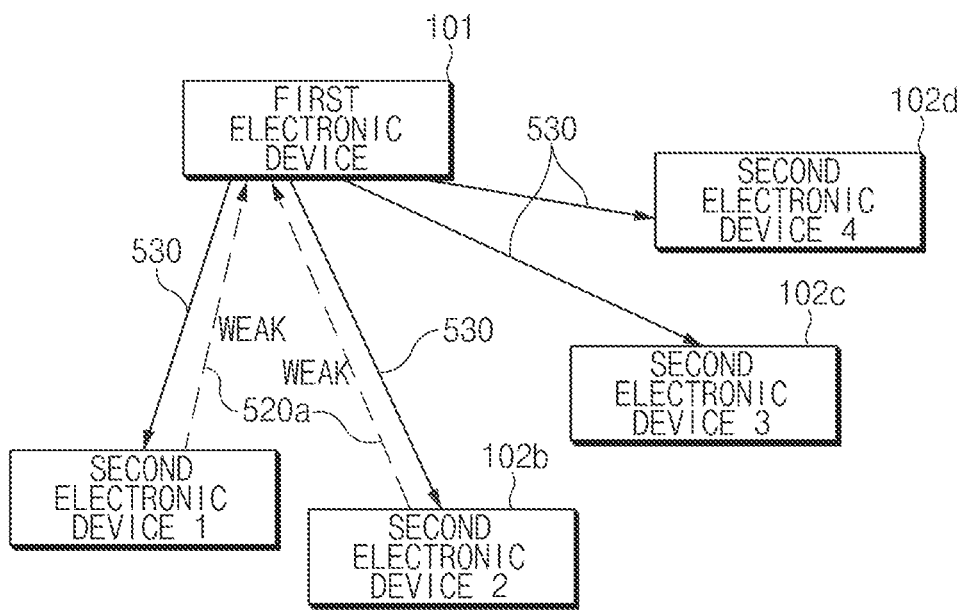

FIGS. 5A and 5B are views illustrating a signal transmission between electronic devices according to various embodiments of the present disclosure.

FIG. 5A is a configuration view for describing a signal transmission between electronic devices before a request signal update.

Referring to FIG. 5A, a first electronic device 101 may advertise a request signal 510. A second electronic device (e.g., second electronic device1 102a) may advertise a response signal 520a in response to the request signal 510 received from the first electronic device 101. The response signal 520a may include identification information identifying the second electronic device1 102a advertising the response signal 520a.

Each of the second electronic device1 102a, the second electronic device 2 102b, the second electronic device3 102c and the second electronic device4 102d may have a different intensity of response signals 520a and 520b advertised according to each device communication environment. For example, the intensities of response signals 520a of the second electronic device1 102a and the second electronic device2 102b may be weak relatively. On the other hand, the intensities of response signals 520b of the second electronic device3 102c and the second electronic device4 102d may be strong relatively. Accordingly, during a same time, the first electronic device 101 may receive a relatively small amount of packets with respect to the response signals 520a of the second electronic device1 102a and the second electronic device2 102b and may receive a large amount of packets with respect to the response signals 520b of the second electronic device3 120c and the second electronic device4 102d.

The first electronic device 101 may update the request signal 510 to include identification information identifying the second electronic device3 120c and the second electronic device4 102d in the reception rejection field of the request signal 510.

FIG. 5B is a configuration view for describing a signal transmission between electronic devices after a request signal update.

Referring to FIG. 5B, a first electronic device 101 may advertise an updated request signal 530. Each of second electronic device1 102a, second electronic device 2 102b, second electronic device3 102c and second electronic device4 102d may receive the updated request signal 530 and may check whether identification information identifying the second electronic devices 102a, 102b, 102c and 102d is included in a reception rejection field of the updated request signal 530. When the identification information identifying the second electronic devices 102a, 102b, 102c and 102d is included in the reception rejection field, the respective second electronic device (e.g., 102a, 102b, 102c or 102d) determines that it does not need to advertise a response signal 520a anymore and may stop the transmission of the response signal 520a.

For example, the second electronic device3 102c and the second electronic device4 102d may check that their identification information is included in the reception rejection field of the updated request signal 530 and may not advertise the response signal 520a anymore. On the other hand, the second electronic device1 102a and the second electronic device2 102b may check that their identification information is not included in the reception rejection field of the updated request signal 530 and may advertise the response signal 520a continuously. The first electronic device 101 may receive the response signal 520a only from the second electronic device1 102a and the second electronic device2 102b whose response signal 520a has a relatively weak intensity. Through this, the first electronic device 101 may receive packets of more than a specified amount from all the second electronic devices.

Figure 6:
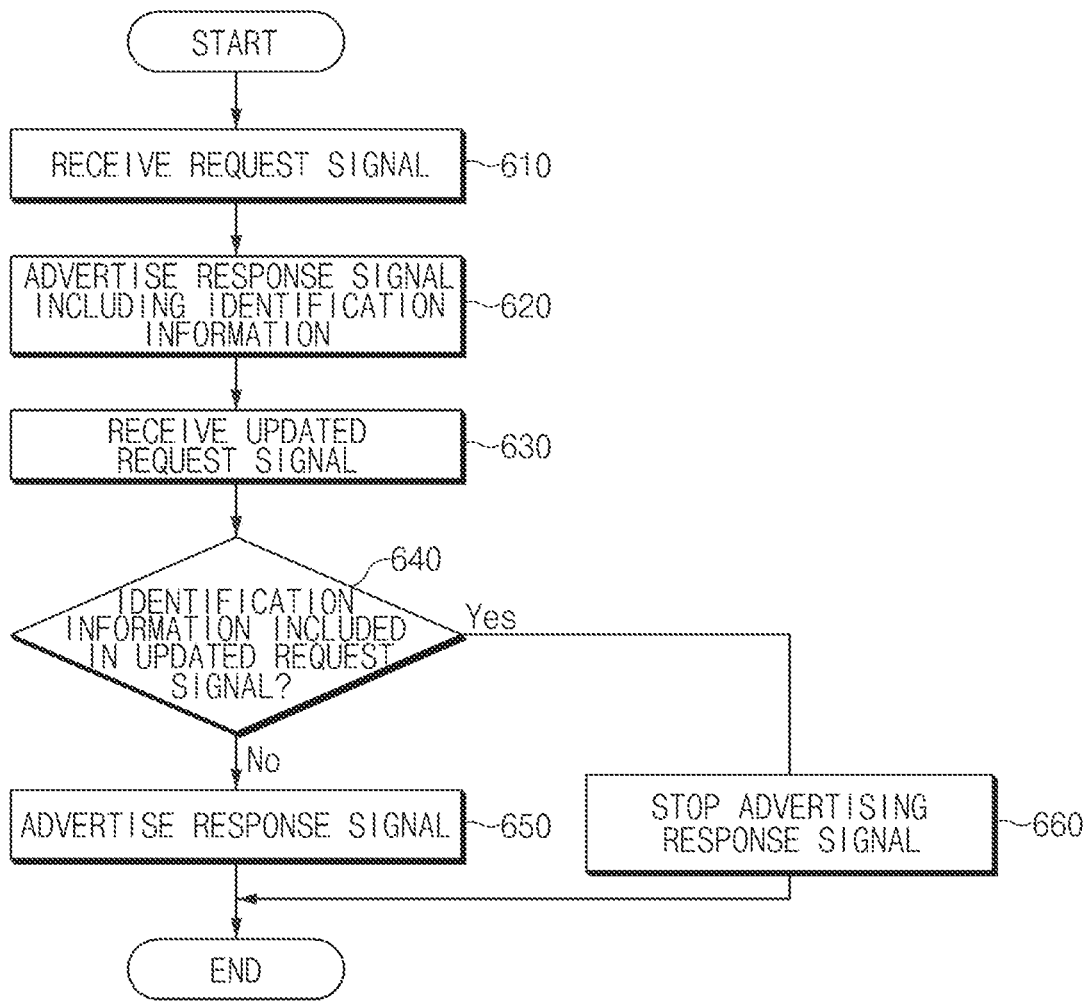
FIG. 6 is a process view illustrating an operation for a device search in a second electronic device according to an embodiment of the present disclosure.

FIG. 6 is a process view illustrating an operation for a device search in a second electronic device according to an embodiment of the present disclosure.

Referring to FIG. 6, the second electronic device 102 of FIG. 1 may receive a request signal advertised from the first electronic device 101 of FIG. 1 in operation 610.

According to various embodiments of the present disclosure, in operation 620, the second electronic device 102 may advertise a response signal including identification information identifying the second electronic device 102 in response to the request signal received from the first electronic device 101.

In operation 630, the second electronic device 102 may receive an updated request signal from the first electronic device 101. The updated request signal may include identification information identifying the at least part of the second electronic device 102.

In operation 640, the second electronic device 102 may check whether its identification information is included in a reception rejection field of the updated request information.

In operation 650, when the identification of the second electronic device 102 is not included in the reception rejection field, the second electronic device 102 may advertise a response signal continuously. On the other hand, in operation 660, when the identification of the second electronic device 102 is included in the reception rejection field, the second electronic device 102 may stop advertising a response signal.

According to an embodiment of the present disclosure, when the identification of the second electronic device 102 is included in the reception rejection field, the second electronic device 102 may advertise a response signal after a preset time or a time set in an updated request signal. According to another embodiment of the present disclosure, when the identification of the second electronic device 102 is included in the reception rejection field, the second electronic device 102 may set a transmission power of a response signal to be lower than before. When the intensity of a response signal of the second electronic device 102 is relatively strong, the second electronic device 102 may lower a transmission power of the response signal to be less than a preset transmission power or a transmission power set in the updated request signal to advertise the response signal with an intensity similar to that of another second electronic device.

According to another embodiment of the present disclosure, when the identification of the second electronic device 102 is included in the reception rejection field, the second electronic device 102 may set a period of advertising a response signal to be longer. When the period of a response signal of the second electronic device 102 is relatively short, the second electronic device 102 may set the period of the response signal to be longer at a period similar to that of another second electronic device. The second electronic device 102 may prevent the duplication of a packet received by the first electronic device 101 by setting a period of advertising a response signal to be a preset period or a period set in an updated request signal. According to another embodiment of the present disclosure, when the identification of the second electronic device 102 is included in the reception rejection field, the second electronic device 102 may stop advertising until an additional request is received from the first electronic device 101. The second electronic device 102 may resume advertising a response signal when the first electronic device 101 transmits an additional request.

Figure 7:
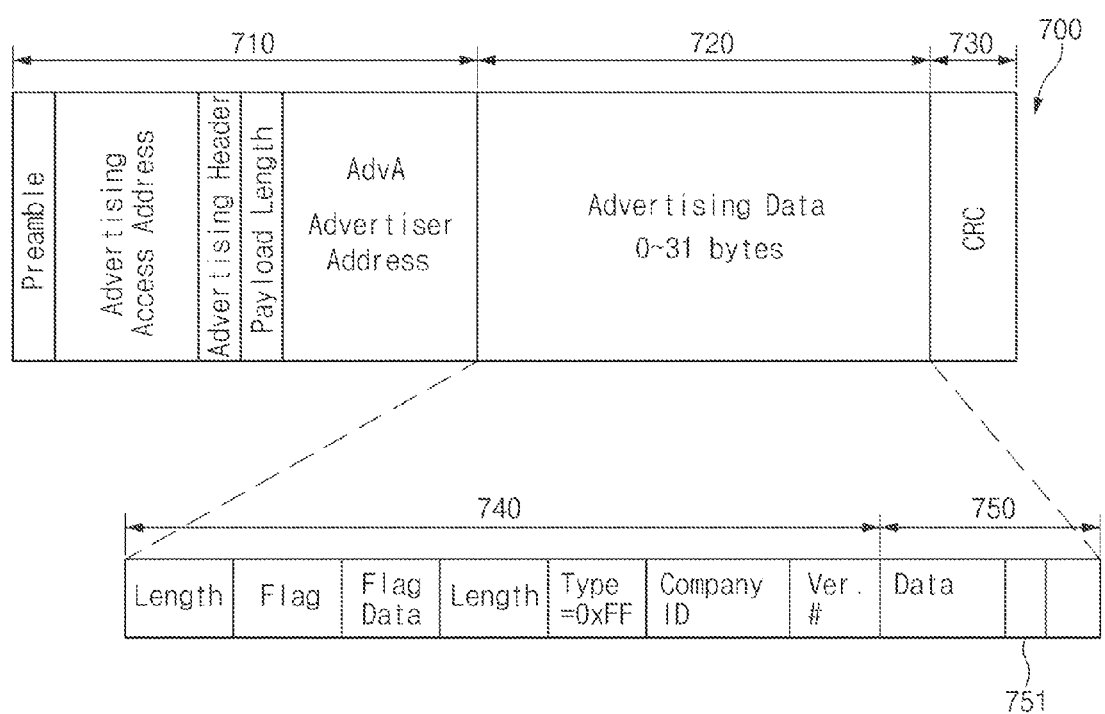
FIG. 7 is a view illustrating a packet configuration of a request signal according to an embodiment of the present disclosure.

FIG. 7 is a view illustrating a packet configuration of a request signal according to an embodiment of the present disclosure.

Referring to FIG. 7, the first electronic device 101 of FIG. 1 may transmit/receive data to/from the second electronic device 102 of FIG. 1 through Bluetooth low energy (BLE) communication. The first electronic device 101 may configure a request signal with an advertising packet 700 according to BLE communication standards. However, the request signal is not limited to a configuration by BLE communication method and may have a configuration by another broadcasting or multicasting communication method.

The BLE communication may be implemented with an active method and a passive method. The active method may include transmitting, the advertising packet 700 by the first electronic device 101, transmitting a scan request signal corresponding thereto by the second electronic device 102, and transmitting/receiving data by transmitting a scan response signal by the first electronic device 101 again. On the other hand, the passive method may include transmitting the advertising packet 700 only from the first electronic device 101. A request signal may be implemented with the advertising packet 700 in both the active method and the passive method.

The advertising packet 700 may include a header field 710, an advertising data field 720, and an error test field 730. The header field 710 may include packet information such as a preamble an advertising access address, an advertising header, a payload length and an advertiser address (AdvA). The advertising data field 720 may include advertising data transmitted from a device. The error test field 730 may be a field for checking whether a packet error occurs by, for example, a cyclic redundancy check (CRC).

According to various embodiments of the present disclosure, the advertising data field 720 may be 32 bytes and may be divided into an information field 740 and a data field 750. The information field 740 may include information, for example, a length of the advertising data field 720, a flag, flag data, type information, version information, company ID information and/or additional length information. The data field 750 may include a reception rejection field 751.

The first electronic device 101 may store at least part of identification information identifying the second electronic device 102 in the reception rejection field 751. The second electronic device 102 having the identification information stored in the reception rejection field may be an electronic device whose response signal has a relatively strong intensity. The second electronic device 102 may check a storage content of the reception rejection field 751 and, when the identification information identifying the second electronic device 102 is included in the reception rejection field 751, may not advertise a response signal any more. According to another embodiment of the present disclosure, the reception rejection field 751 may serve as a role for the transmission pause or transmission resetting of a response signal in addition to the transmission stop of a response signal.

According to an embodiment of the present disclosure, after searching the second electronic device 102 through the advertising packet 700 for a specified time, the first electronic device 101 may advertise a function execution signal using at least part of the second electronic device 102 as a target. The function execution signal may be a signal for requesting to perform a specific function in the second electronic device 102. After searching the second electronic device 102 for a specified time, the first electronic device 101 may store in the data field 750 identification information identifying part of the second electronic device 102 included in a communication space and information regarding a specific function. When identification information identifying the second electronic device 102 is included in the data field 750, the second electronic device 102 may check the information regarding a function and may then perform the function. For example, the first electronic device 101 may store in the data field 750 identification information identifying the second electronic device1 102a and the second electronic device2 102b, as illustrated in FIG. 1, and information for Wi-Fi Direct connection. The second electronic device1 102a and the second electronic device2 102b may check the identification information and the information for Wi-Fi Direct connection and may attempt the Wi-Fi Direct connection with the first electronic device 101.

According to various embodiments of the present disclosure, a device searching method may include advertising, by the first electronic device 101, a request signal, receiving, by the first electronic device 101, a response signal from the second electronic device 102 having received the request signal, updating, by the first electronic device 101, the request signal to include identification information identifying at least part of the second electronic device 102, advertising, by the first electronic device 101, the updated request signal, and receiving, by the first electronic device 101, the response signal from at least part of the second electronic device 102.

The updating and the advertising of the request signal may include determining, by the first electronic device 101, the at least part of the second electronic device based on an intensity of the response signal and updating, by the first electronic device 101, a request signal to include the identification information identifying the at least part of the second electronic device. For example, the determining of the at least part may include determining, by the first electronic device 101, the second electronic device 102 transmitting the response signal of more than a predetermined reference intensity as the at least part. Additionally, the determining of the at least part may include determining, by the first electronic device 101, a predetermined number in the second electronic device 102 as the at least part. The determining of the at least part may include determining, by the first electronic device 101, a predetermined ratio in the second electronic device 102 as the at least part.

The intensity of the response signal may be determined according to a number or an amount of packets received by the first electronic device 101 for a predetermined time. It is characterized that the request signal may include at least one field of reception rejection, transmission stop, and transmission resetting and the identification information identifying the at least part is stored in the field.

The method may further include advertising, by the first electronic device 101, a function execution signal on a specific second electronic device 102 based on a reception result of the response signal. Additionally, it is characterized that the method may be performed through short range wireless communication including BLE.

It is characterized that the response signal includes the identification information identifying the second electronic device 102. It is characterized that the identification information corresponds to information identifying an electronic device, for example, the MAC address or ID of the second electronic device 102.

A device searching method may include receiving, by the second electronic device 102, a request signal from the first electronic device 101, advertising, by the second electronic device 102, a response signal including identification information, receiving, by the second electronic device 102, an updated request signal from the first electronic device 101, checking, by the second electronic device 102, whether identification information identifying the second electronic device 102 is included in the updated request signal, and advertising, by the second electronic device 102, the response signal, when the identification information identifying the second electronic device 102 is not included in the request signal.

When the identification information identifying the second electronic device 102 is included in the updated request signal, the method may further include advertising, by the second electronic device 102, the response signal after a preset time or a time included in the updated request signal.

When the identification information identifying the second electronic device 102 is included in the updated request signal, the method may further include advertising, by the second electronic device 102, the response signal with a transmission power less than that in the updated request signal. When the identification information identifying the second electronic device 102 is included in the updated request signal, the method may further include stopping, by the second electronic device 102, to advertise the response signal.

When the identification information identifying the second electronic device 102 is included in the updated request signal, the method may further include advertising, by the second electronic device 102, the response signal at a preset period or a period included in the updated request signal.

When the identification information identifying the second electronic device 102 is included in the updated request signal, the method may further include advertising, by the second electronic device 102, the response signal as receiving an additional request signal.

It is characterized that the identification information corresponds to information identifying an electronic device, for example, the MAC address or ID of the second electronic device 102. It is characterized that the method may be performed through short range wireless communication including BLE.

According to various embodiments of the present disclosure, repetitive and unnecessary data transmission may be reduced by limiting the data transmission of at least part of an electronic device on a predetermined space.

Additionally, according to various embodiments of the present disclosure, overall network complexity may be reduced by reducing the amount of packets advertised on a predetermined space and accordingly, overall data reception rate may be increased.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of searching for an electronic device, the method comprising:
   advertising, by a first electronic device, a request signal;
   receiving, by the first electronic device, a response signal from a second electronic device having received the request signal;
   updating, by the first electronic device, the request signal to include identification information identifying at least part of the second electronic device;
   advertising, by the first electronic device, the updated request signal; and
   receiving, by the first electronic device, a response signal from the remaining second electronic device except for the at least part of the second electronic device.

2. The method of claim 1, wherein the updating of the request signal comprises:
   determining, by the first electronic device, the at least part of the second electronic device based on an intensity of the received response signal; and
   updating, by the first electronic device, the request signal to include the identification information identifying the at least part of the second electronic device.

3. The method of claim 2, wherein the determining of the at least part of the second electronic device further comprises determining, by the first electronic device, as the at least part of the second electronic device, an electronic device transmitting the response signal of more than a predetermined reference intensity.

4. The method of claim 2, wherein the determining of the at least part of the second electronic device further comprises determining, by the first electronic device, a predetermined number in the second electronic device as the at least part of the second electronic device.

5. The method of claim 2, wherein the determining of the at least part of the second electronic device further comprises determining, by the first electronic device, a predetermined ratio in the second electronic device as the at least part of the second electronic device.

6. The method of claim 2, wherein the intensity of the response signal is determined by the first electronic device based on a number or an amount of packets received for a predetermined time.

7. The method of claim 1,
wherein the request signal comprises at least one field of reception rejection, transmission stop or transmission resetting, and
wherein the at least one field is configured to store identification information identifying the at least part of the second electronic device.

8. The method of claim 1, further comprising, advertising, by the first electronic device, a function execution signal for a specific second electronic device based on a reception result of the response signal.

9. The method of claim 1, wherein the method is performed through short range wireless communication including Bluetooth low energy (BLE).

10. The method of claim 1, wherein the response signal comprises identification information identifying the second electronic device.

11. The method of claim 10, wherein the identification information corresponds to information identifying an electronic device such as a media access control (MAC) address or an identification (ID) of the second electronic device.

12. The method of claim 1, wherein the advertising of the request signal includes advertising the request signal to a plurality of unspecified electronic devices within a specific range of the first electronic device.

13. A non-transitory computer-readable recording medium having a program for controlling an operation of an electronic device recorded thereon, the program causing the electronic device to execute the method of claim 1.

14. A method of searching for an electronic device, the method comprising:
receiving, by a second electronic device, a request signal from a first electronic device;
advertising, by the second electronic device, a response signal including identification information;
receiving, by the second electronic device, an updated request signal from the first electronic device;
checking, by the second electronic device, whether identification information identifying the second electronic device is included in the updated request signal; and
when the identification information identifying the second electronic device is not included in the updated request signal, advertising, by the second electronic device, a response signal.

15. The method of claim 14, further comprising, when the identification information identifying the second electronic device is included in the updated request signal, advertising, by the second electronic device, a response signal after a preset time or a time included in the updated request signal.

16. The method of claim 14, further comprising, when the identification information identifying the second electronic device is included in the updated request signal, advertising, by the second electronic device, a response signal with a preset transmission power or a transmission power less than that of the updated request signal.

17. The method of claim 14, further comprising, when the identification information identifying the second electronic device is included in the updated request signal, stopping, by the second electronic device, a response signal from being advertised.

18. The method of claim 14, further comprising, when the identification information identifying the second electronic device is included in the updated request signal, advertising, by the second electronic device, a response signal at a preset period or a period included in the updated request signal.

19. The method of claim 14, further comprising, when the identification information identifying the second electronic device is included in the updated request signal, advertising, by the second electronic device, a response signal as the first electronic device receives an additional request signal.

20. The method of claim 14, wherein the identification information corresponds to information identifying an electronic device such as a media access control (MAC) address or an identification (ID) of the second electronic device.

21. The method according to claim 14, wherein the device searching method is performed through short range wireless communication including Bluetooth low energy (BLE).

22. An electronic device for searching for a device, the electronic device comprising:
a communication interface; and
a processor,
wherein the communication interface is configured to:
advertise a request signal, and
receive a response signal from another electronic device having received the request signal,
wherein the processor is configured to update the request signal to include identification information identifying at least part of the other electronic device, and
wherein the communication interface is further configured to:
advertise the updated request signal, and
receive a response signal from the remaining second electronic device except for the at least part of the other electronic device.

* * * * *